US011552862B2

(12) United States Patent
Ryu

(10) Patent No.: US 11,552,862 B2
(45) Date of Patent: Jan. 10, 2023

(54) METHOD FOR MEASURING OPERATION PERFORMANCE OF INTELLIGENT INFORMATION SYSTEM

(71) Applicant: Bespin Global Inc., Seoul (KR)

(72) Inventor: Ho-Jung Ryu, Gwangmyeong-si (KR)

(73) Assignee: Bespin Global Inc., Seoul (KR)

( * ) Notice: Subject to any disclaimer, the term of this patent is extended or adjusted under 35 U.S.C. 154(b) by 0 days.

(21) Appl. No.: 17/290,646

(22) PCT Filed: Oct. 31, 2019

(86) PCT No.: PCT/KR2019/014639
§ 371 (c)(1),
(2) Date: Apr. 30, 2021

(87) PCT Pub. No.: WO2020/091477
PCT Pub. Date: May 7, 2020

(65) Prior Publication Data
US 2022/0124007 A1 Apr. 21, 2022

(30) Foreign Application Priority Data
Nov. 1, 2018 (KR) .......................... 10-2018-0133183

(51) Int. Cl.
*H04L 41/50* (2022.01)
*H04L 41/5009* (2022.01)
(Continued)

(52) U.S. Cl.
CPC ...... *H04L 41/5032* (2013.01); *H04L 41/5009* (2013.01); *H04L 43/04* (2013.01); *H04L 43/0876* (2013.01)

(58) Field of Classification Search
CPC . H04L 41/5032; H04L 41/5009; H04L 43/04; H04L 43/0876; G06Q 10/06; G06Q 10/10; G06Q 10/0639; G06Q 10/0637
See application file for complete search history.

(56) References Cited

U.S. PATENT DOCUMENTS

2019/0041836 A1* 2/2019 Cella .................. G06N 5/046

FOREIGN PATENT DOCUMENTS

JP 2004-153812 A 5/2004
KR 10-2000-0072475 A 12/2000
(Continued)

OTHER PUBLICATIONS

69 Page Computer Document, "e-Government Performance Management Agency Briefing Session," *Ministry of Government Administration and Home Affairs of the Republic of Korea, The National Information Society Agency of the Republic of Korea and The Korea Regional Information Development Institute*, Mar. 9-Mar. 10, 2017.
(Continued)

*Primary Examiner* — Joe Chacko
(74) *Attorney, Agent, or Firm* — Morgan, Lewis & Bockius LLP

(57) ABSTRACT

The present invention relates to a method for measuring an operation performance of an intelligent information system which is a platform to support automatic collection and analysis for measuring a performance of an operating information system. The method according to the present invention includes: a planning step of establishing a plan for evaluating an operation performance by registering basic evaluation information for evaluating the information system and setting an evaluation condition including a measurement criterion of a measurement time or a measurement schedule; an evaluation step of performing cost evaluation required for operating the information system, utilization evaluation of determining a utilization frequency and a utilization type, quality evaluation of evaluating the quality of the information system by calculating a measurement index related to a failure of the information system and collecting user satisfaction, and task performance evaluation of determining whether the number of users connected or
(Continued)

registered into the information system increases and whether a performance goal is achieved; and an analysis and diagnosis step of converting the result value into a numerical value by analyzing the evaluation step, and classifying the information system into at least one management type according to the conversion criteria to diagnose an operation performance. The present invention has an advantage in that an information system operated through an automated platform can be smoothly analyzed and a method for operating the information system can be presented by collecting performance information and providing the performance information to a user continuously in the future even after analyzing the information system.

10 Claims, 15 Drawing Sheets

(51) Int. Cl.
    *H04L 43/04*         (2022.01)
    *H04L 43/0876*     (2022.01)

(56) References Cited

FOREIGN PATENT DOCUMENTS

| KR | 10-2005-0095230 A | 9/2005 |
| KR | 10-2009-0002308 A | 1/2009 |
| KR | 10-2009-0028054 A | 3/2009 |
| KR | 10-1182703 B1 | 9/2012 |
| KR | 10-2014-0113806 A | 9/2014 |
| KR | 10-2017-0085315 A | 7/2017 |
| KR | 10-2017-0091336 A | 8/2017 |

OTHER PUBLICATIONS

106 Page Computer Document, "A Performance Measurement Manual for Information System Operation," *Ministry of Government Administration and Home Affairs of the Republic of Korea and The National Information Society Agency of the Republic of Korea*, Apr. 2017.

A web document relating to "Application Management Field" and especially "Application Performance Management (APM)," *Google Website of Watchtech Co., Ltd., a Korean Company*, Aug. 16, 2019.

\* cited by examiner

|  | Decision maker | Task manager | Person in charge of task |
|---|---|---|---|
| Task viewpoint |  |  |  |
| Cost viewpoint |  | Analysis report for each viewpoint |  |
| Customer viewpoint |  |  |  |
| System viewpoint |  |  |  |
| Time viewpoint |  |  |  |

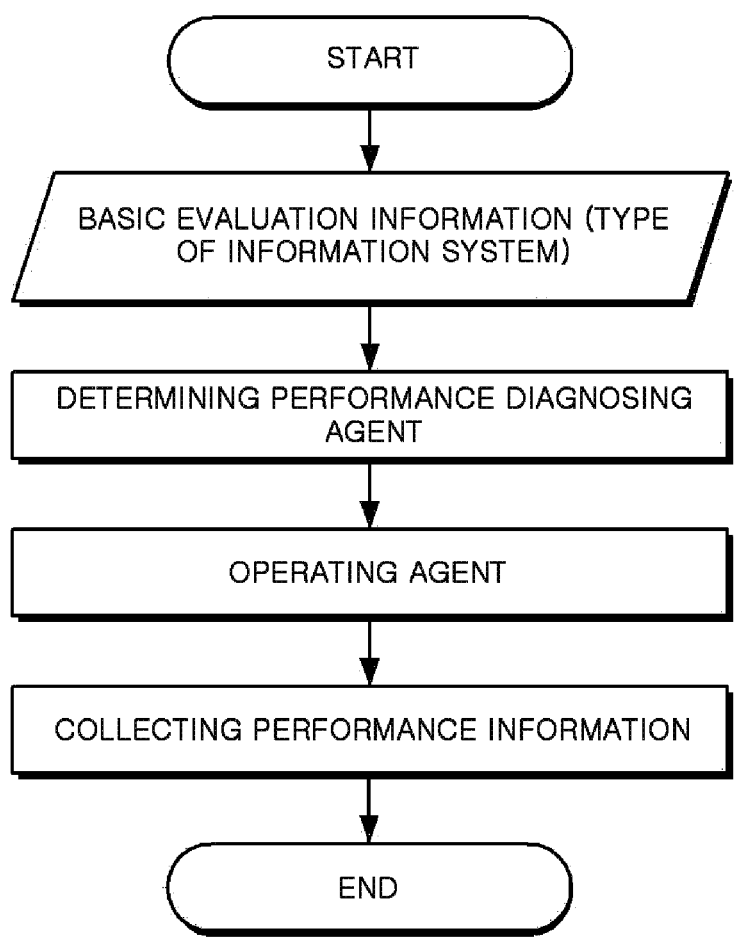

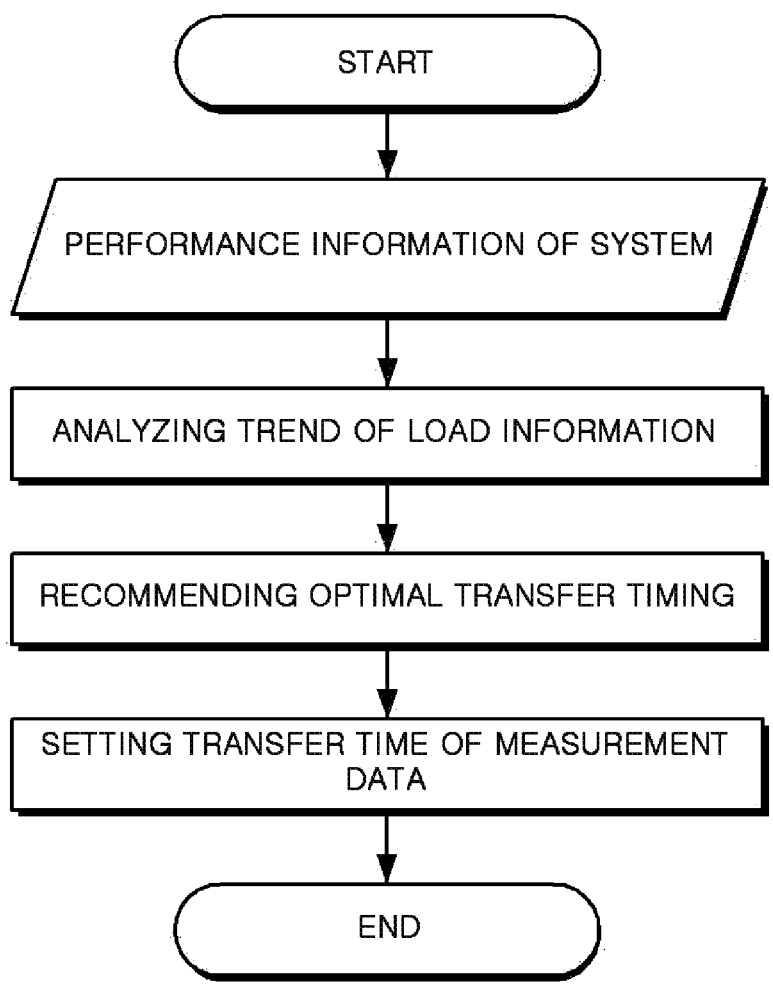

METHOD FOR MEASURING OPERATION PERFORMANCE OF INTELLIGENT INFORMATION SYSTEM

CROSS-REFERENCE TO RELATED APPLICATION

The present application is a U.S. National Phase entry of International Patent Application No. PCT/KR2019/014639, filed Oct. 31, 2019, which claims priority to Korean Patent Application No. 10-2018-0133183, filed on Nov. 1, 2018, the entire contents of which is incorporated herein for all purposes by this reference.

BACKGROUND OF THE INVENTION

Field of the Invention

The present invention relates to a method for measuring an operation performance of an intelligent information system, and particularly, to a method for measuring an operation performance of an intelligent information system which is a platform to support automated collection and analysis for measuring a performance of an operating information system.

Description of Related Art

In the case of a program that measures a performance of a general information system, task management is performed by a person, while the provision of an automated platform for collecting the measurement performance is performed by a server and an automation program.

Since the nature, size (scale), and characteristics of the information systems operated by each institution are all different, it is impossible to apply evaluation equally to the information systems of all institutions. Therefore, it is necessary to establish the contents for evaluating the operation management of the system according to each institution by referring to detailed guidelines made for each operation management element.

In this regard, the conventional Korean Patent Unexamined Publication Gazette No. 2000-0072475 (Enterprise Information Management Service System and Method Thereof) discloses an information management service system and a method thereof, which increase reliability of enterprise information for a related institution and obtain a value for transparency of information by expanding a utilization area of the enterprise information externally to create an enterprise profit in financial fields such as enterprise credit management, electronic financial services, etc., therefrom.

However, the conventional information management service system and method are limited only to a method for operating the information system rather than measuring the performance of the information system, and as a result, the conventional information management service system and method cannot evaluate the operation performance for whether an actually operated information system is well operated.

PRIOR ART DOCUMENT

Patent Document (Patent Document 1) Korean Patent Unexamined Publication Gazette No. 2000-0072475

BRIEF SUMMARY

In order to solve the problem, an object of the present invention is to provide a method for automatically measuring a performance of an operated information system.

In order to achieve the object, the present invention provides a method for measuring an operation performance of an intelligent information system, which evaluates, analyzes, and diagnoses an operation performance of an information system providing an IT service, which includes: a planning step of establishing a plan for evaluating an operation performance by registering basic evaluation information including status information, cost information, input element information, and a performance goal for evaluating the information system and setting an evaluation condition including a measurement criterion of a measurement time or a measurement schedule; an evaluation step of performing evaluation of cost required for operating the information system, utilization evaluation of determining a utilization frequency and a utilization type, quality evaluation of evaluating the quality of the information system by calculating a measurement index related to a failure of the information system and collecting user satisfaction, and task performance evaluation of determining whether the number of users connected or registered into the information system increases and whether a performance goal is achieved; and an analysis and diagnosis step of converting the result value into a numerical value by analyzing the evaluation step, and classifying the information system into at least one management type according to the conversion criteria to diagnose an operation performance.

Preferably, the planning step may include a basic evaluation information registering step of automatically inputting the basic evaluation information through interworking/linking with an internal system or manually inputting the basic evaluation information according to an input criterion of input items provided by the information system by collecting status documents in which input target information is written; and an evaluation plan establishing step of inputting the measurement time and the measurement criterion of the information system, and setting a schedule of each step such as cost evaluation, utilization evaluation, quality evaluation, task performance evaluation, and management type determination.

Preferably, in the evaluation step, the cost evaluation may further include a step of receiving cost information including initial development cost, additional development cost, maintenance cost, and operation cost of the information system; and a step of calculating a conversion score according to a preset evaluation criterion by receiving the cost information and determining operational adequacy, ease of maintenance, and cost efficiency of the information system.

Preferably, in the evaluation step, the utilization evaluation may further include a step of classifying each function used in the operation of the information system and the frequency of utilization of the function into a low frequency, medium frequency, high frequency, or event according to a preset evaluation criterion; and a step of by testing the information system during a predetermined period and classifying the number of visits (clicks) and utilization time for the function as non-utilization, under-utilization or utilization according to a preset evaluation criterion.

Preferably, in the evaluation step, the quality evaluation may further include a step of evaluating the system quality and the service quality of the information system, evaluating the system quality based on failure data related to the failure and recovery of the information system, and evaluating the service quality based on preset response data required for operation for information processing; and a step of converting the result of the quality evaluation into numerical values by collecting the evaluation results of the system quality and the service quality.

Preferably, the evaluation step may further include a step of classifying the information system according to the characteristics of the system including the client/server, web, database, and mobile app; and a step of collecting each function through a function information collector and an agent by the information system.

Preferably, the function information collector may input a representative URL or a sub-URL for collection of the information system, recognize or extract hyperlinks and menu names of web pages to parse the extracted data, and automatically generate a menu ID to store data in a hierarchical structure.

Preferably, the agent may collect performance information in which each function of the information system is utilized, and monitor whether the performance information is continuously collected.

Preferably, the analysis and diagnosis step may further include a step of calculating the result value of the evaluation step (S30) separately in terms of the cost aspect and the task aspect; and a step of determining the management type by dividing the management type of the information system into redevelopment, maintenance, functional enhancement or disposal, etc., according to the result value in terms of the cost aspect and the task aspect.

Advantageous Effects

According to the present invention having the above-described configuration, there is an advantage in that an information system operated through an automated platform can be smoothly analyzed.

Further, the present invention has an advantage in that a plan for operating the information system can be presented by collecting performance information and providing the collected performance information to a user continuously in the future even after analyzing the information system.

BRIEF DESCRIPTION OF THE DRAWINGS

FIG. 13 illustrates a flowchart of collecting performance information by an agent according to an embodiment of the present invention.

FIG. 14 illustrates a flowchart of transferring measurement data according to an embodiment of the present disclosure.

DETAILED DESCRIPTION

Figure 1:
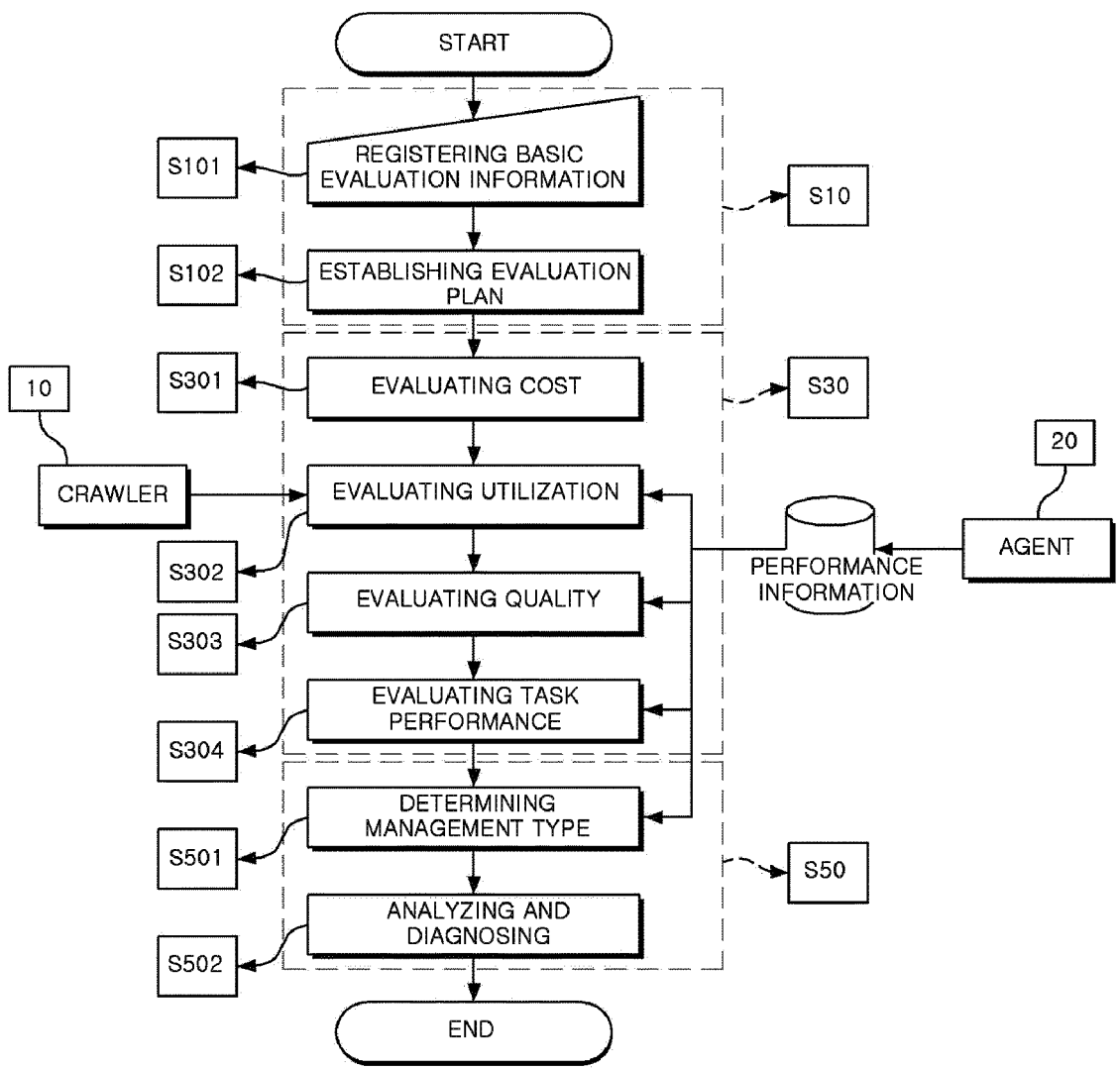
FIG. 1 illustrates a flowchart of a method for measuring an operation performance of an intelligent information system according to the present invention.

Hereinafter, the present invention will be described in detail with reference to contents disclosed in the accompanying drawings. However, the present invention is not restricted or limited by exemplary embodiments. Like reference numerals presented in each drawing refer to elements that perform substantially the same functions.

Objects and effects of the present invention may be naturally appreciated or clear by the following description and the objects and effects of the present invention are not limited only by the following description. Further, in describing the present invention, a detailed description of known technologies associated with the present invention may be omitted when it is determined that the detailed description may unnecessarily obscure the subject matter of the present invention.

FIG. 1 illustrates a flowchart of a method for measuring an operation performance of an intelligent information system according to the present invention. Referring to FIG. 1, the present invention may include a planning step (S10), an evaluation step (S30), and an analysis and diagnosis step (S50).

The planning step (S10) is a step of registering basic evaluation information including status information, cost information, input element information, and a performance goal for evaluating an information system and establishing a plan for evaluating an operation performance by setting an evaluation condition including a measurement criterion of a measurement time or a measurement schedule.

The planning step (S10) may include a basic evaluation information registering step (S101) of automatically inputting the basic evaluation information through interworking/linking with an internal system or manually inputting the basic evaluation information according to an input criterion of input items provided by an information system by collecting status documents in which input target information is written; and an evaluation plan establishing step (S102) of inputting the measurement time and the measurement criterion of the information system, and setting a schedule of each step such as cost evaluation, utilization evaluation, quality evaluation, task performance evaluation, and management type determination.

The planning step (S10) may be started from the preparation for measurement after a person in charge of performance measurement of the information system log in into the system. The person in charge of performance measurement checks the status of the information system operated by an organization to which they belong and registers basic information for evaluation.

The basic evaluation information may include status information of information system, cost information, input element information, performance goal of information system, and customer (user) information. The person in charge of performance measurement sets conditions for selection of a measurement target system among the registered information systems, and then establishes a measurement plan for the selected measurement target system.

The evaluation step (S30) is a step of performing cost evaluation (S301) of evaluating cost required for operating the information system, utilization evaluation (S302) of determining a utilization frequency and a utilization type, quality evaluation (S303) of evaluating the quality of the information system by calculating a measurement index related to a failure of the information system and collecting user satisfaction, and task performance evaluation (S304) of determining whether the number of users connected or registered into the information system increases and whether a performance goal is achieved.

The person in charge of performance measurement performs the cost evaluation (S301) by using the cost information among the input basic evaluation information. In the cost evaluation (S301), an evaluation criterion is evaluated according to the cost evaluation criteria setting for the year. The person in charge of performance measurement evaluates the utilization of each measurement target system. During evaluation, the function information collector 10 for collecting function information of the information system and the performance diagnosis agent 20 may be set according to the characteristics of the measurement target system (Web, DB, Mobile App, C/S).

For the utilization evaluation (S302), the collection of a function list of each information system should be preceded, and completeness of a measurement target function should be guaranteed. Most of the systems do not have the function list, or have the function list in the form of a document, or even if the systems have the function list, it is difficult to manage the version, making it difficult to secure the latest function list.

To this end, the function list of each system is secured through the function information collector 10 and matched with a function name expressed in human language to easily secure a complete function list. In the case of the mobile app, a functional information collector 10 similar to that of a web system may be used. A DB type system (data providing system) utilizes a DB catalog functional information collector 10.

After a function for measuring the utilization is secured, the agent 20 according to the characteristics of each system is driven to collect utilization measurement data and store the measurement data according to a measurement rule. A final measurement result may be monitored and the measurement result may be corrected when an exceptional situation occurs or the characteristics of each function are reflected.

The person in charge of performance measurement may conduct the quality evaluation (S303) in parallel with the utilization measurement, and the quality evaluation (S303) may consist of measurement of information system quality and user satisfaction. Finally, a final quality evaluation score may be automatically calculated by summing the measurement values of system quality and service quality according to their respective weights.

Information system quality is again constituted by system quality and service quality.

The person in charge of performance measurement sets measurement index and criteria (e.g., response time by function, average response time, etc.) for system quality measurement. The person in charge of performance measurement checks and monitors whether the agent 20 for system quality measurement is operated, and checks the measurement values according to a measurement cycle.

Service quality is an index to determine the stability of service as confirming the quality of overall service provision. To this end, the person in charge of performance measurement sets measurement index and criteria (e.g., downtime, recovery time, etc.), checks and monitors whether the agent 20 is operated for service quality measurement, and checks the measurement values according to the measurement cycle.

The person in charge of performance measurement may select one of two measurement methods below for measuring task performance evaluation (S304):

First, it is an automated method wherein the task performance valuation may be measured based on the number of users of the measured target system set when registering the basic evaluation information. To this end, a log collected from the agent 20 is analyzed to extract data such as the number of visitors, the number of unique visitors, and the number of increased visitors, and whether the number of users increases based on the number of initially registered users is checked to measure the task performance evaluation.

Second, it is a method using a document wherein whether a task performance goal value of each system is achieved is received as the document, a performance achievement level is measured based on the document, and a measurement value is inputted as a measured value.

Values measured in both methods may be reflected singly or both, and result values of task performance evaluation are derived through comparison of an achievement level compared to that of the previous year or through increase in performance achievement.

The analysis and diagnosis step (S50) is a step of analyzing the evaluation step (S30), converting the result value into a numerical value, and classifying the information system into at least one management type according to the conversion criteria to diagnose an operation performance.

The person in charge of performance measurement determines an average value of a cost evaluation value as a final cost aspect evaluation result value, and determines an average value of the sum of utilization evaluation, quality evaluation, and task performance evaluation values as a final task aspect evaluation result value in order to finally determine the management type. The person in charge of performance measurement may determine the management type (disposal, consolidation, redevelopment, and maintenance) according to a management type determination model by using these two values.

When applying the model for determining the management type (S501), the person in charge of performance measurement may set a criterion value as a 3-point criterion, an institutional average, an overall average and the like in embodiments. The person in charge of performance measurement performs various analysis and diagnosis on the target system for analysis and diagnosis functions for the final decision-making for determination of the management type to determine the final management type.

For analysis and diagnosis, a multi-dimensional analysis function is provided for various information secured by the system. The person in charge of performance measurement reflects an analysis result to determine the final management type. If the initial measurement result is changed, the result of analysis and diagnosis that influences the decision-making is provided so that the result may be attached to the final result.

FIGS. 2 to 10 are diagrams for subdividing and describing FIG. 1, and it will be described below according to each drawing.

Figure 2:
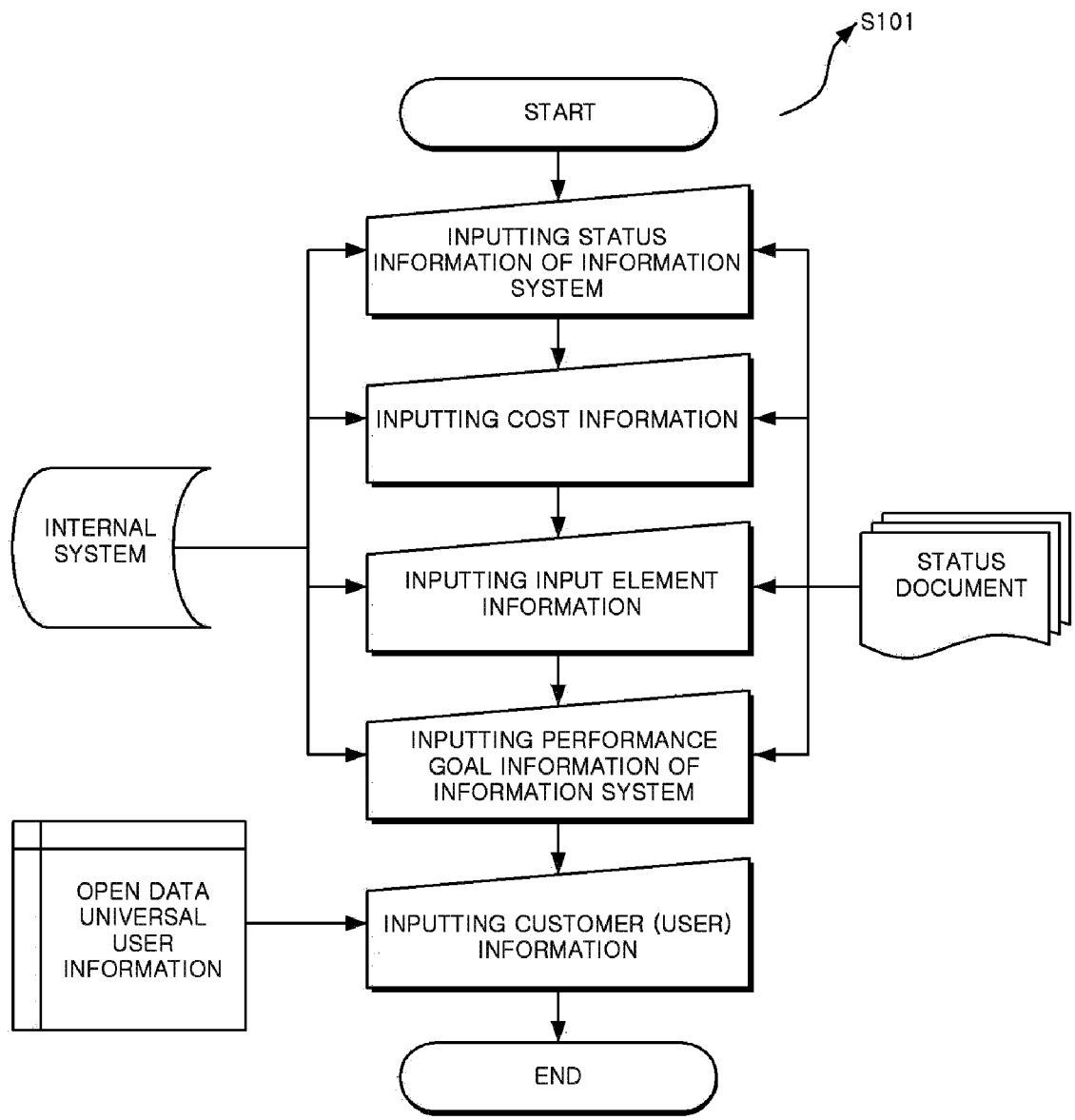
FIG. 2 illustrates a flowchart of registering basic evaluation information according to an embodiment of the present invention.

FIG. 2 illustrates a flowchart of registering basic evaluation information according to an embodiment of the present invention. Referring to FIG. 2, the person in charge of performance measurement starts registration while inputting basic information for measurement.

There are two methods for registering the basic evaluation information (S101). A first method is an automatic input method through interworking/linkage to internal system when there is an internal system which has each input target information, while a second method is a method that collects status documents in which the input target information is written and inputs the input target information according to an input criterion of an input item provided by the system when there is no internal system.

Information system status information is information corresponding to an overview of the measurement target information system (system name, English name, development period, introduction time, operation start date, maintenance start date, system characteristics <web, mobile app, DB service, C/S>, point information for completing a functional system such as representative URL for function collection, and a collection cycle).

Cost information includes initial construction cost, additional construction cost, and maintenance cost. Constituent items of information system cost information may include consulting cost, construction personnel cost, H/W introduction cost, S/W introduction cost, and network operation cost, and are input according to the organization's information system operation cost calculation system, but classified by year.

Input element information is information on development companies and personnel who participate in the construction and operation. This includes company information, input personnel information, input personnel rating, and input period.

Information system performance goal information is information for a function of setting performance goals to be achieved by the information system. If there is an existing performance management system such as BSC, information may be interworked/linked, but if a performance goal is not set for each information system, information may be manually inputted. Performance goal information is constituted by performance areas, performance indexes, measurement methods, measurement cycles, and persons in charge of measurement.

Customer (user) information is a quantification value of who is an end user of the measurement target system and how many people use the measurement target system. In the case of national institutions, the Open Data universal user information provided by the system is provided by utilizing various open data such as those of the National Statistical Office, and the user can be inputted by reference to the provided Open Data universal user information.

Figure 3:
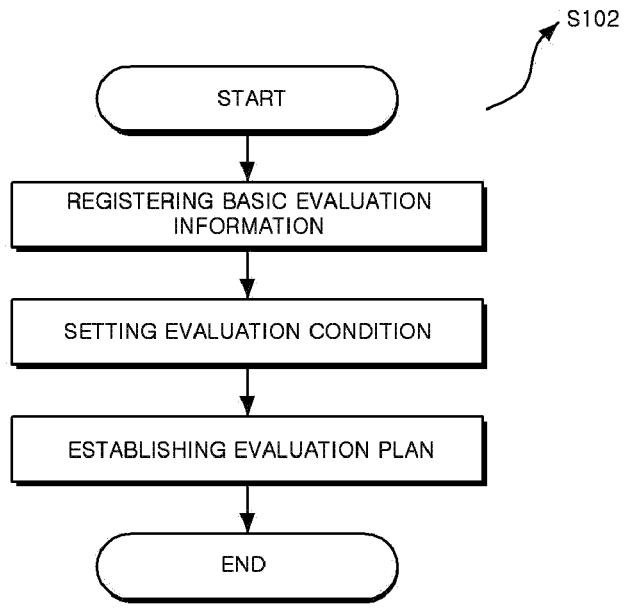
FIG. 3 illustrates a flowchart of an evaluation step according to an embodiment of the present invention.

FIG. 3 illustrates a flowchart of the evaluation step (S30) according to an embodiment of the present invention. Referring to FIG. 3, the evaluation step (S30) may include a step of classifying the information system according to the characteristics of the system including the client/server, web, database, and mobile app, and a step of collecting each function through the function information collector 10 and the agent 20 from the information system.

The person in charge of performance measurement establishes an evaluation plan by using the information inputted in the basic evaluation information. In setting evaluation conditions, the performance measurement target system may be selected, a measurement schedule and a person in charge of measurement may be designated, and basic evaluation information such as performance goals and cost information may be checked. The target system may be measured at the same time as being built and operated.

The measurement timing may be set as immediate measurement or measurement after a predetermined period (e.g., 3 years/5 years after construction), and in terms of cost information, conditions may be set such as whether only a predetermined amount or more will be measured for integrated cost of construction and operation costs.

The person in charge of performance measurement establishes a measurement plan by inquiring the information system corresponding to the set measurement criteria. In establishing the evaluation plan, a schedule of each step such as the preparation, the cost evaluation (S301), the utilization evaluation (S302), the quality evaluation (S303), the task performance evaluation (S304), and the management type determination (S501) may be set.

When the sunset conditions of each target system have arrived, the evaluation result may be determined as disposal without being reflected to the evaluation plan. The progress against the plan is monitored by monitoring the progress of each evaluation schedule.

Figure 4:
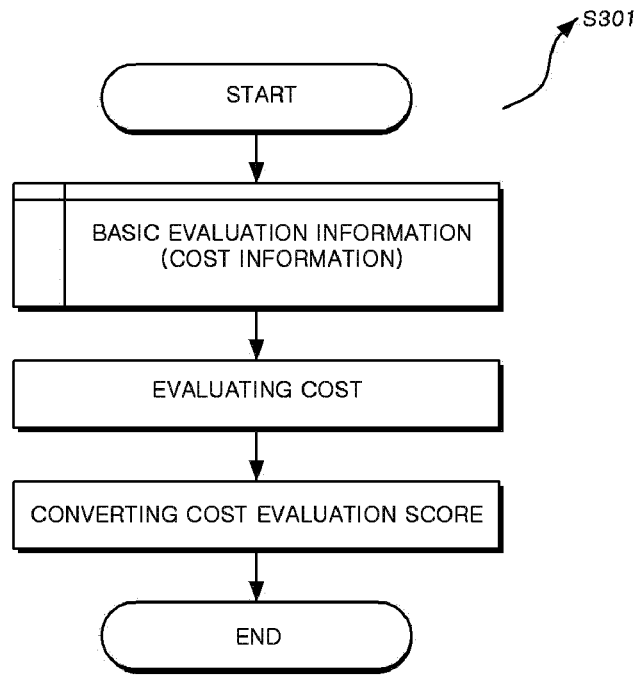
FIG. 4 illustrates a flowchart of cost evaluation in the evaluation step according to an embodiment of the present invention.

FIG. 4 illustrates a flowchart of the cost evaluation (S301) in the evaluation step (S30) according to an embodiment of the present invention. Referring to FIG. 4, the cost evaluation (S301) may include a step of receiving cost information including initial development cost, additional development cost, maintenance cost, and operation cost of the information system; and a step of calculating a conversion score according to a preset evaluation criterion by receiving the cost information and determining operational adequacy (appropriateness of operation), ease of maintenance, and cost efficiency of the information system.

The person in charge of performance measurement performs the cost evaluation (S301) by using the cost information among the input basic evaluation information. For the cost evaluation, information such as the initial development cost, the additional development cost, the maintenance cost, and the operation cost is used. The cost evaluation area consists of operational adequacy, ease of maintenance, and cost efficiency.

Referring to Table 1, the operational adequacy is an item to determine whether an effort for cost improvement is required when accumulated maintenance costs exceed a predetermined ratio of a total development cost, and the ease of maintenance is an item to determine whether the information system maintains a cost-efficient structure by analyzing an increase/decrease level of the input operation/maintenance cost. The cost efficiency is an item to determine whether the information system is maintaining a cost-efficient structure compared to a utilization scale.

TABLE 1

| Classification | Cost Aspect | | |
|---|---|---|---|
| | Operational Adequacy Cumulative maintenance cost ratio | Ease of Maintenance Increase/decrease rate of input operation and maintenance cost | Cost Efficiency Increase/decrease rate of average operation and maintenance cost |
| 5 points | Less than 50% | Less than −20% | Less than −60% |
| 4 points | 50% or more-less than 80% | −20% or more-less than 0% | −60% or more-less than −30% |
| 3 points | 80% or more-less than 100% | 0% or more-less than 30% | −30% or more-less than 10% |
| 2 points | 100% or more-less than 120% | 30% or more-less than 100% | 10% or more-less than 50% |
| 1 point | 120% or more | 100% or more | 50% or more |

<Cost Evaluation Conversion Score>

The index of each area is defined as an index having the following names: the operational adequacy (cumulative maintenance cost rate), ease of maintenance (increase/decrease rate of input operation and maintenance cost ratio), cost efficiency (increase/decrease rate of average operation and maintenance cost ratio), etc.

The person in charge of performance measurement may convert the score by using a cost evaluation result value.

In applying the conversion criterion, conversion according to a policy guide may be applied, and its own criterion may also be applied. The conversion criterion is managed by DB and applied flexibly.

In order to apply the institution's own conversion criterion, it is also possible to set and define a section value by calculating each data required for measurement, such as construction cost, operation cost, maintenance cost, etc. of all information systems provided.

Figure 5:
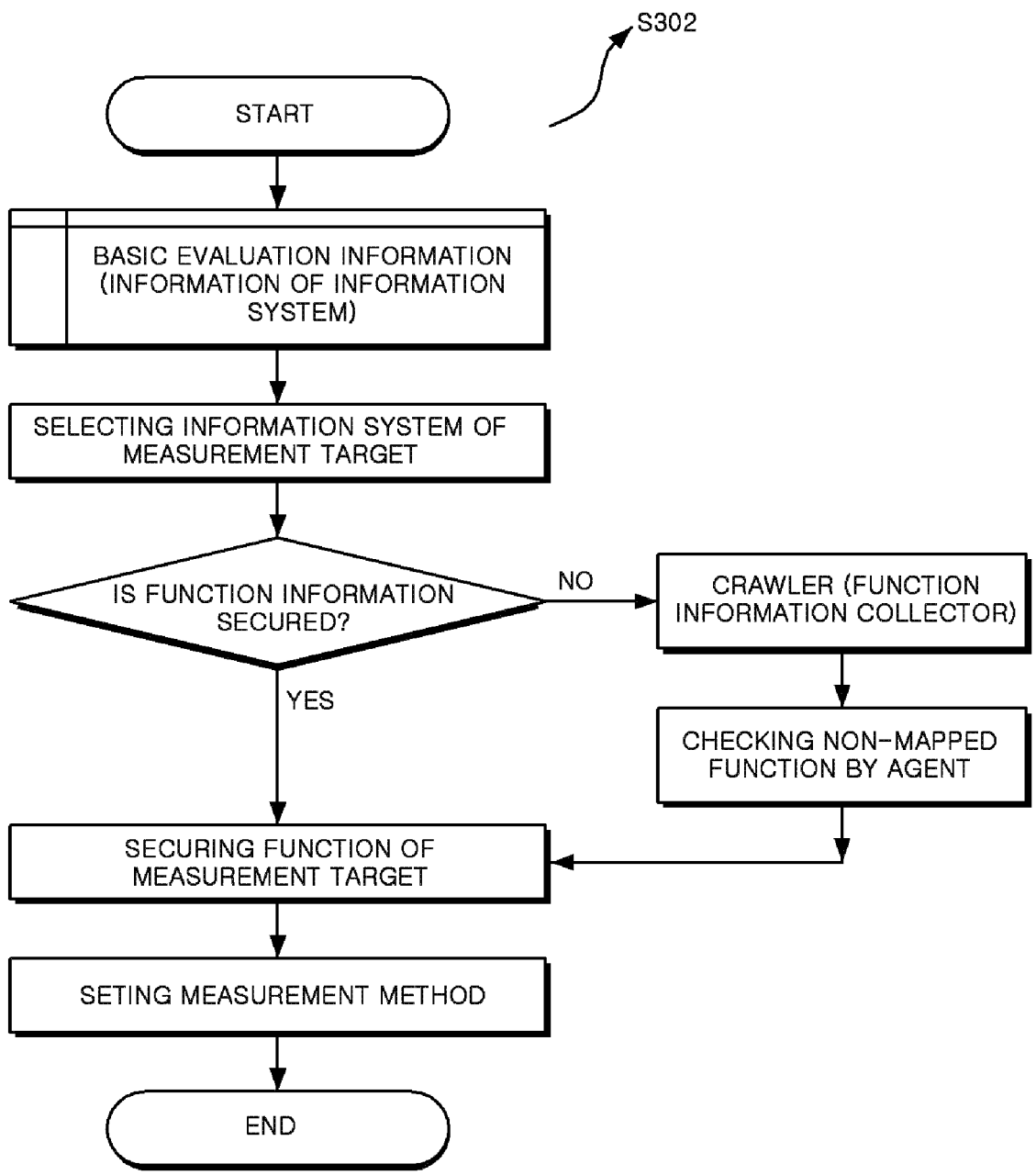
FIG. 5 illustrates a flowchart of utilization evaluation in the evaluation step according to an embodiment of the present invention.

FIG. 5 illustrates a flowchart of utilization evaluation (S302) in the evaluation step (S30) according to an embodiment of the present invention. Referring to FIG. 5, the utilization evaluation (S302) may include a step of classifying each function used in the operation of the information system and classifying the utilization frequency of the function into a low frequency, medium frequency, high frequency, or event according to a preset evaluation criterion; and a step of classifying the number of visits (clicks) and utilization time for the function as non-utilization, under-utilization or utilization according to a preset evaluation criterion by testing the information system during a predetermined period.

The person in charge of performance measurement checks the status of the information system inputted in the basic evaluation information and the target system set in the evaluation plan. By considering the type of the target system (web, mobile app, DB, C/S), it is checked whether the measurement target function list information of the measurement target system is secured.

If the function of the measurement target system is secured and when it is determined that the information is currently valid information, the measurement method is set. If the function of the measurement target system is not secured, the function information collector suitable for each type of system is operated so that the entire list may be secured.

If the measurement target system has previously measured records, it is checked whether there is an unmapped function and then a mapping work is performed. After all measurement target functions are secured, the person in charge of performance measurement sets the characteristics of the frequency type and utilization type for each function, and then sets the measurement cycle of the measurement target system. The frequency type may be classified into low frequency, medium frequency, high frequency, and event, and the utilization type may be classified into non-utilization, under-utilization, and utilization.

In order to determine the utilization type, the utilization type may be defined as a ratio within a normal distribution by applying a statistical method based on the utilization evaluation collected from the agent 20 during a predetermined period as a test measurement period.

In order to improve the accuracy of utilization measurement of each function, outliers occurring during the test period may be set to be identified and data in the corresponding range may be set to be deleted. The utilization of each function is determined through each measurement result, and the utilization is evaluated by converting the numbers of utilization and under-utilization functions into a ratio to the total number of functions.

The under-utilization function is calculated by defining the under-utilization function as a predetermined ratio to the utilization function. Whether each function is used is determined by the number of visits (number of clicks), the time of stay, and the like of each function collected from the agent 20.

Figure 6:
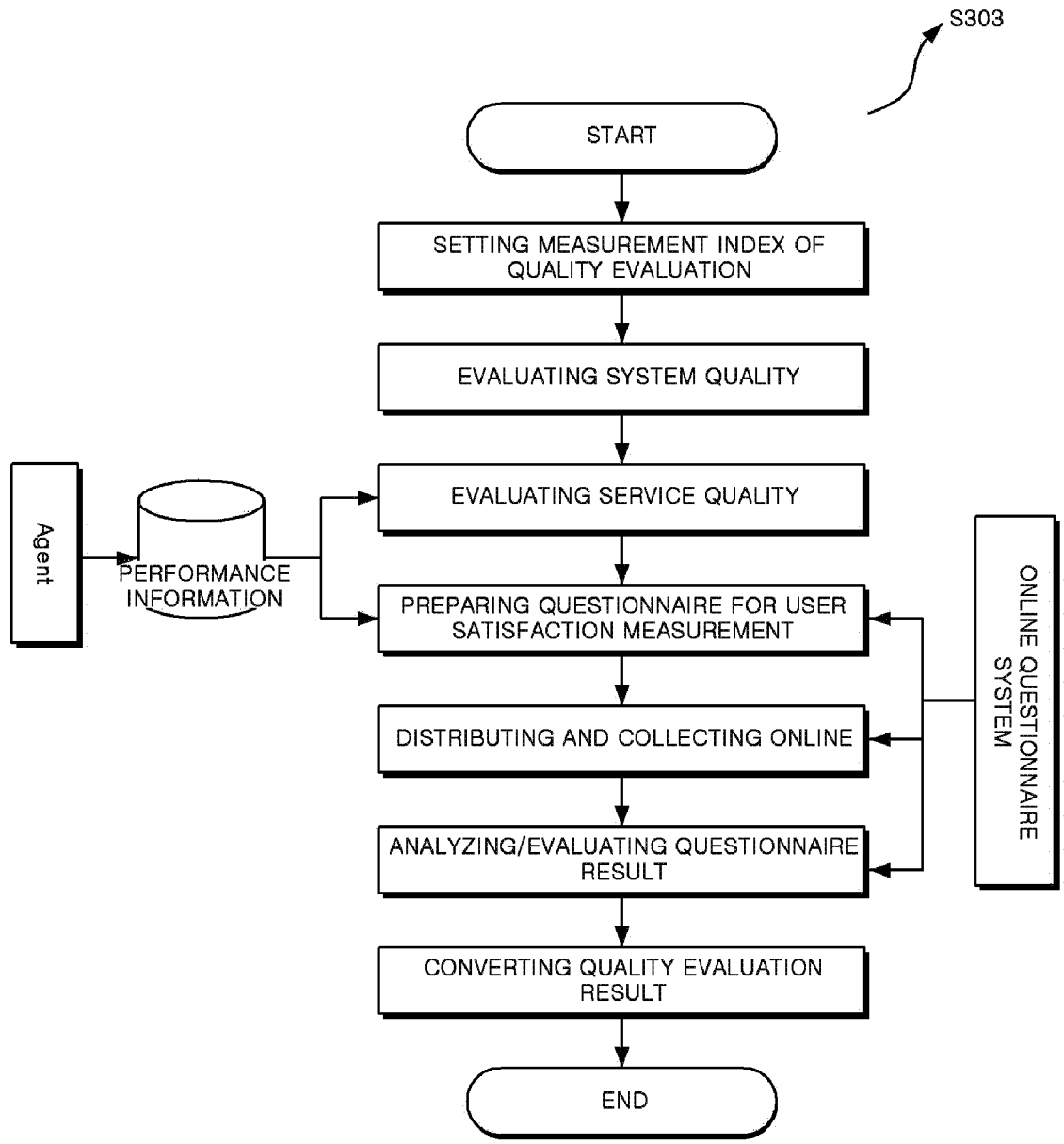
FIG. 6 illustrates a flowchart of quality evaluation in the evaluation step according to an embodiment of the present invention.

FIG. 6 illustrates a flowchart of the quality evaluation (S303) in the evaluation step (S30) according to an embodiment of the present invention. Referring to FIG. 6, the quality evaluation (S303) may include a step of evaluating the system quality and the service quality of the information system, wherein the system quality is evaluated based on failure data related to the failure and recovery of the information system and the service quality is evaluated based on preset response data required in operation for information processing; and a step of converting the result of the quality evaluation into numerical values by collecting the evaluation results of the system quality and the service quality.

The person in charge of performance measurement conducts information system quality evaluation and user satisfaction measurement for quality evaluation of the measurement target information system. The information system quality evaluation is constituted by the system quality and the service quality.

Measurement of system quality is a measurement of the quality of whether the information system stably provides services for end users, and the system quality is measured by processing the data collected from the agent 20.

Examples of measurement indexes of system quality include system failure time, failure recovery time, system operation rate, number of failure occurrences, failure recovery time, and the like, and in the service quality evaluation, it is measured how much the system provides the required performance in a usable state.

Examples of measurement indexes of service quality include response time and response time change rate, and the person in charge of performance measurement may selectively measure a specific function among the measurement target functions that each information system has.

In the system quality evaluation, the overall operation quality of the measurement target system may be measured, and in the service quality evaluation, the quality of the specific function or the entire target function may be measured. Each measurement value may be converted to a 5-point scale using a conversion table for each section.

In the user satisfaction measurement, actual user's perceived satisfaction is measured by counting the results of a questionnaire or corresponding function-specific response.

The person in charge of performance measurement constructs a questionnaire according to the characteristics of the measurement target information system for online questionnaire measurement, sends the questionnaire to users stored in the system, and aggregates and statistically processes the responded questionnaire results. The overall statistical results may be converted into a quality evaluation result of a 5-point perfect score.

Figure 7:
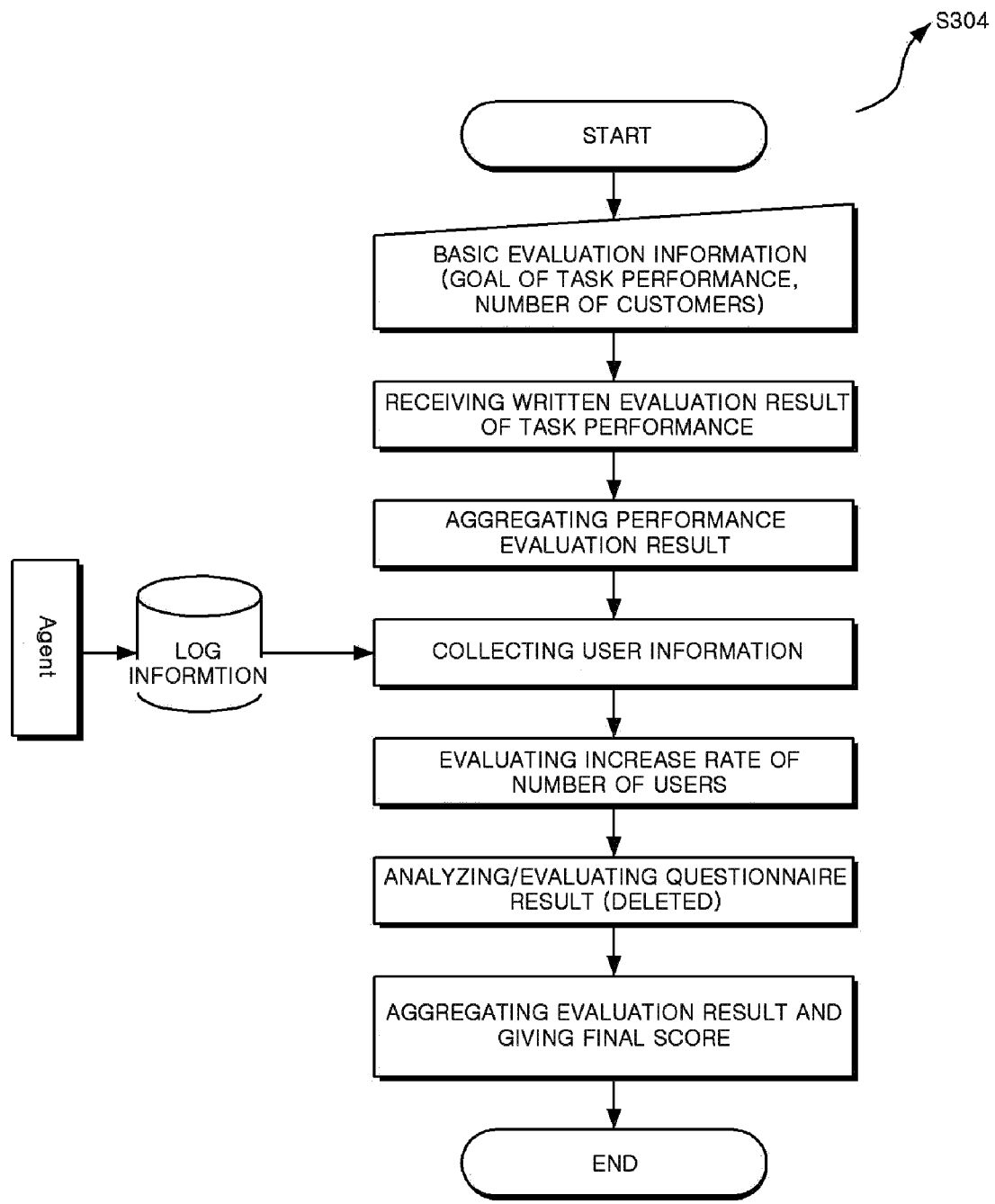
FIG. 7 illustrates a flowchart of task performance evaluation in the evaluation step according to an embodiment of the present invention.

FIG. 7 illustrates a flowchart of the task performance evaluation (S304) in the evaluation step (S30) according to an embodiment of the present invention. Referring to FIG. 7, in the task performance evaluation (S304), a task performance evaluation result may be received based on the basic evaluation information including a task performance goal and the number of customers, and the evaluation result may be counted and a final score may be given based on the user information.

The person in charge of performance measurement may select one of two measurement methods for measuring task performance evaluation. In particular, it is important to measure whether the number of users increases, which may be seen as a direct index in terms of the utilization of the information system.

First, the method is an automated method in which the task performance evaluation may be measured based on the number of users of the measurement target system set when registering the basic evaluation information. To this end, a log collected from the agent 20 is analyzed to extract data derived through comparison to an achievement level compared to the previous year or through increase in performance achievement. Two final values may be averaged or weight averaged, and applied.

Figure 8:
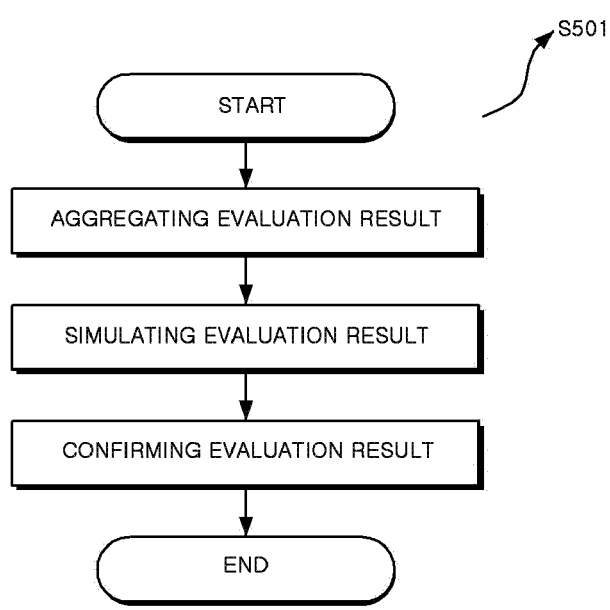
FIG. 8 illustrates a flowchart of determination of management type according to an embodiment of the present invention and FIG. 9 shows an evaluation matrix.

FIG. 8 illustrates a flowchart of the management type determination (S501) according to an embodiment of the present invention. Referring to FIG. 8, the management type may be determined by aggregating the evaluation results and determining the evaluation results through simulation of the evaluation result.

The person in charge of performance measurement aggregates all the results of cost evaluation, utilization evaluation, quality evaluation, and task performance evaluation, and checks whether the measurement results are accurately displayed according to the conversion criteria.

Figure 9:
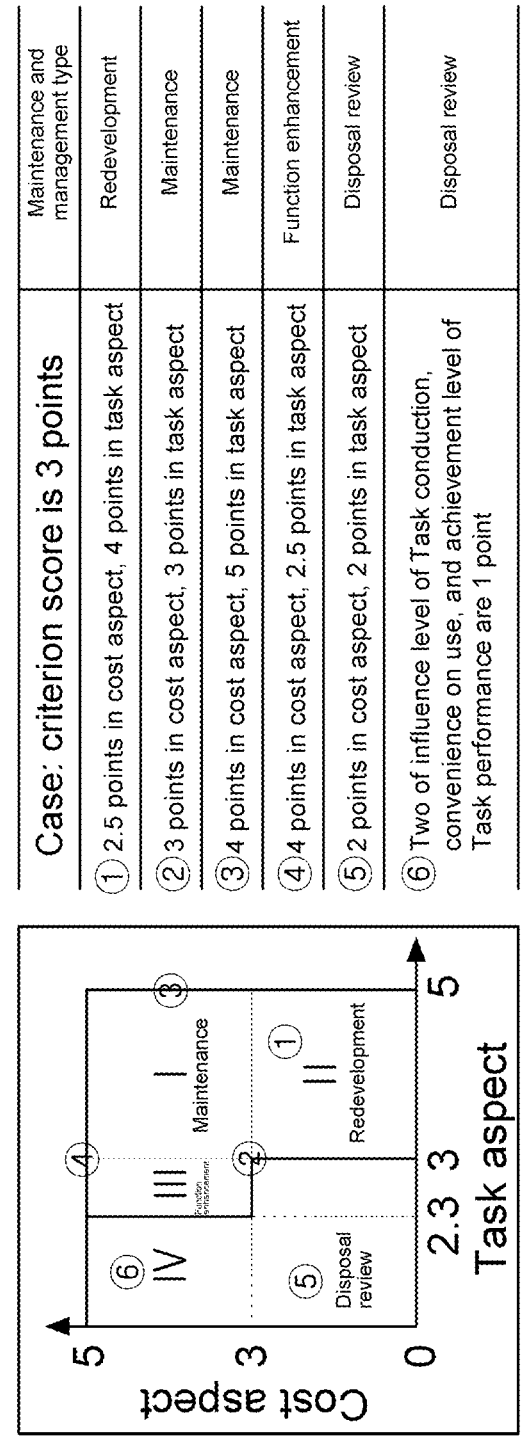

FIG. 9 shows an evaluation matrix. The evaluation result is divided into a cost aspect and a task aspect, and is positioned according to the coordinate values of the evaluation matrix (based on 5 points). According to the position indicated in the evaluation matrix, the evaluation result is simulated to check whether the entire measurement target system has been properly evaluated.

Table 2 shows a score table. In the case of a system in which the evaluation result is judged to be inadequate, the evaluation result of each system is checked by referring to the entire score table in the form of a radar chart as shown in Table 2 and evaluation data and the result value of the corresponding area are checked to confirm the evaluation result.

TABLE 2

| | Cost aspect | | | Task aspect | | | |
| --- | --- | --- | --- | --- | --- | --- | --- |
| | | Ease of | Efficiency | | | achievement level of Task performance | |
| Classification | Operational adequacy Cumulative maintenance cost ratio | maintenance increase/decrease rate of input operation and maintenance cost | of cost increase/decrease rate of average operation and maintenance cost | influence level of Task conduction Function utilization | Convenience on Use Use convenience | achievement level of task performance compared to goal (option 1) | increase/decrease rate of task performance (option 2) |
| 5 points | Less than 50% | Less than −20% | Less than −60% | 90% or more | 90% or more | 130% or more | 70% or more |
| 4 points | 50% or more-less than 80% | −20% or more-less than 0% | −60% or more-less than −30% | 80% or more-less than 90% | 80% or more-less than 90% | 110% or more-less than 130% | 30% or more-less than 70% |
| 3 points | 80% or more-less than 100% | 0% or more-less than 30% | −30% or more-less than 10% | 70% or more-less than 80% | 70% or more-less than 80% | 100% or more-less than 110% | 0% or more-less than 30% |
| 2 points | 100% or more-less than 120% | 30% or more-less than 100% | 10% or more-less than 50% | 60% or more-less than 70% | 60% or more-less than 70% | 90% or more-less than 100% | −10% or more-less than 0% |
| 1 point | 120% or more | 100% or more | 50% or more | less than 60% | less than 60% | less than 90% | less than −10% | such as the number of visitors, the number of unique visitors, and the number of increased visitors, and check/measure whether the number of users increases based on the number of initially registered users. The result value of the measurement is converted into a percentage of how much the number of users increased compared to the number of users in the previous year, and the percentage is converted into the 5-point perfect score according to a conversion standard table to give the final score.

Second, the method is one through a document in which whether to achieve a task performance goal value of each system is received as the document and based on this, a performance achievement level is measured to input a measurement value. The rate of increase in performance achievement compared to that of the previous year is measured and converted into the 5-point perfect score according to the conversion criteria table and given as the final score.

Figures 10, 11:
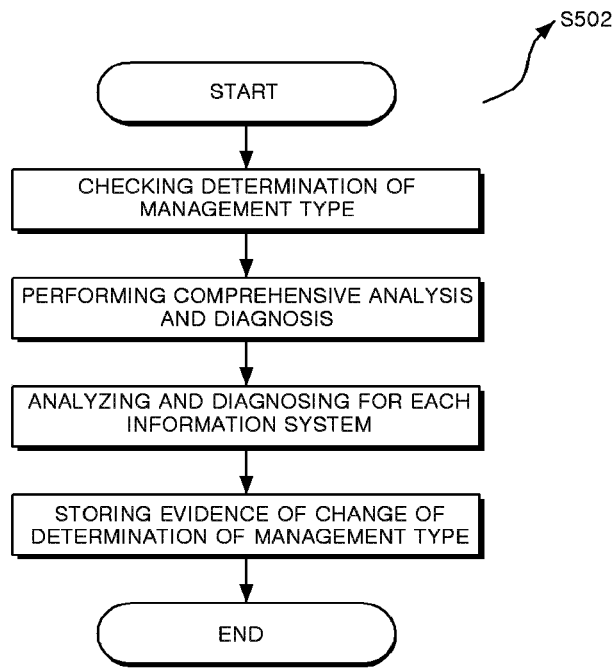
FIG. 10 illustrates a flowchart of an analysis and diagnosis step according to an embodiment of the present invention and FIG. 11 shows an embodiment of an analysis framework.

Values measured in both methods may be reflected singly or both, and task performance evaluation result values are FIG. 10 illustrates a flowchart of the analysis and diagnosis step (S50) according to an embodiment of the present invention. Referring to FIG. 10, the analysis and diagnosis step (S50) may include a step of calculating the result value of the evaluation step (S30) separately in terms of the cost aspect and the task aspect; and a step of determining the management type by dividing the management type of the information system into redevelopment, maintenance, functional enhancement or disposal, etc., according to the result value in terms of the cost aspect and the task aspect.

FIG. 11 shows an embodiment of an analysis framework.

The person in charge of performance measurement checks the result of the management type determination and conducts a full and detailed analysis and diagnosis if it is determined that the measurement result is not appropriate.

When the result of management type determination needs to be changed according to comprehensive analysis according to the analysis framework and result of individual analysis and diagnosis for each information system, the corresponding analysis result may be stored and made as evidence data, which may be presented and the final determination of management type may be changed.

Figure 12:
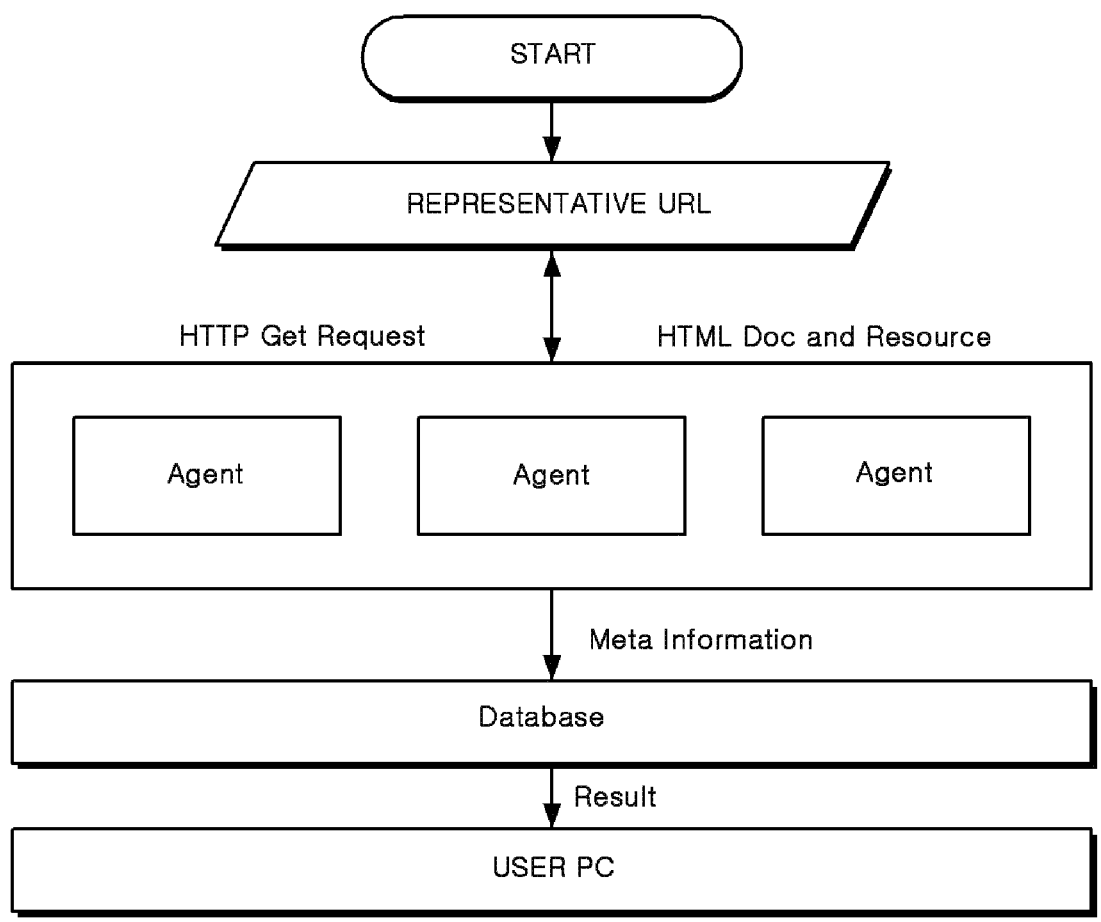
FIG. 12 illustrates a flowchart of collecting functions by a function information collector according to an embodiment of the present invention.

FIG. 12 illustrates a flowchart of collecting functions by a function information collector 10 according to an embodiment of the present invention. Referring to FIG. 12, the function information collector 10 inputs a representative URL of the information system or a sub-URL for collection, recognizes or extracts a hyperlink and a menu name of a web page to parse the extracted data, and automatically generates a menu ID to store data in a hierarchical structure.

The person in charge of performance measurement should secure a complete function list for use in measuring the function utilization of the measurement target information system. In particular, in order to collect functions in a closed network, after installing a function collector separately, function information collection task is supported through linkage/interlock.

The person in charge of performance measurement can input the representative URL or the sub-URL for collection of the measurement target system, and recognize and extract all hyperlinks and menu names in the global menu bar (GMB) of web pages (html, documents, etc.). A purpose thereof is URL mapping for each task function, and automatically parses the extracted data and automatically creates a menu ID to store the data in the hierarchical structure. By arranging and organizing upper and lower associated values of the separated hierarchical structure, the hierarchical function list is completed.

FIG. 13 illustrates a flowchart of collecting performance information by an agent 20 according to an embodiment of the present invention. Referring to FIG. 13, the agent 20 may collect performance information in which each function of the information system is utilized, and monitor whether the performance information is continuously collected.

The person in charge of performance measurement should install an agent 20 capable of collecting the performance information according to the type of measurement target information system for accurate utilization performance measurement. The type of measurement target information system is classified into web, mobile app, DB, and C/S, and after each type is determined, the agent 20 is installed and operated on the measurement target information system. It is monitored whether the performance information is continuously collected in the future.

FIG. 14 illustrates a flowchart of transferring measurement data according to an embodiment of the present disclosure. Referring to FIG. 14, the person in charge of performance measurement of the system to which the present program is applied should transfer performance data collected from the agent 20 to an analysis server for continuous performance measurement.

Since the transfer should not affect the service quality of the information system in operation due to the transfer, considering a load during transfer, the system continuously monitors an optimum transfer time and recommends an optimal time in consideration of the collected performance information (CPU, Memory, and Disk). The person in charge of performance measurement sets the transfer time by reviewing the optimal transfer time, and transfers the measurement data at the set transfer time.

Figure 15A:
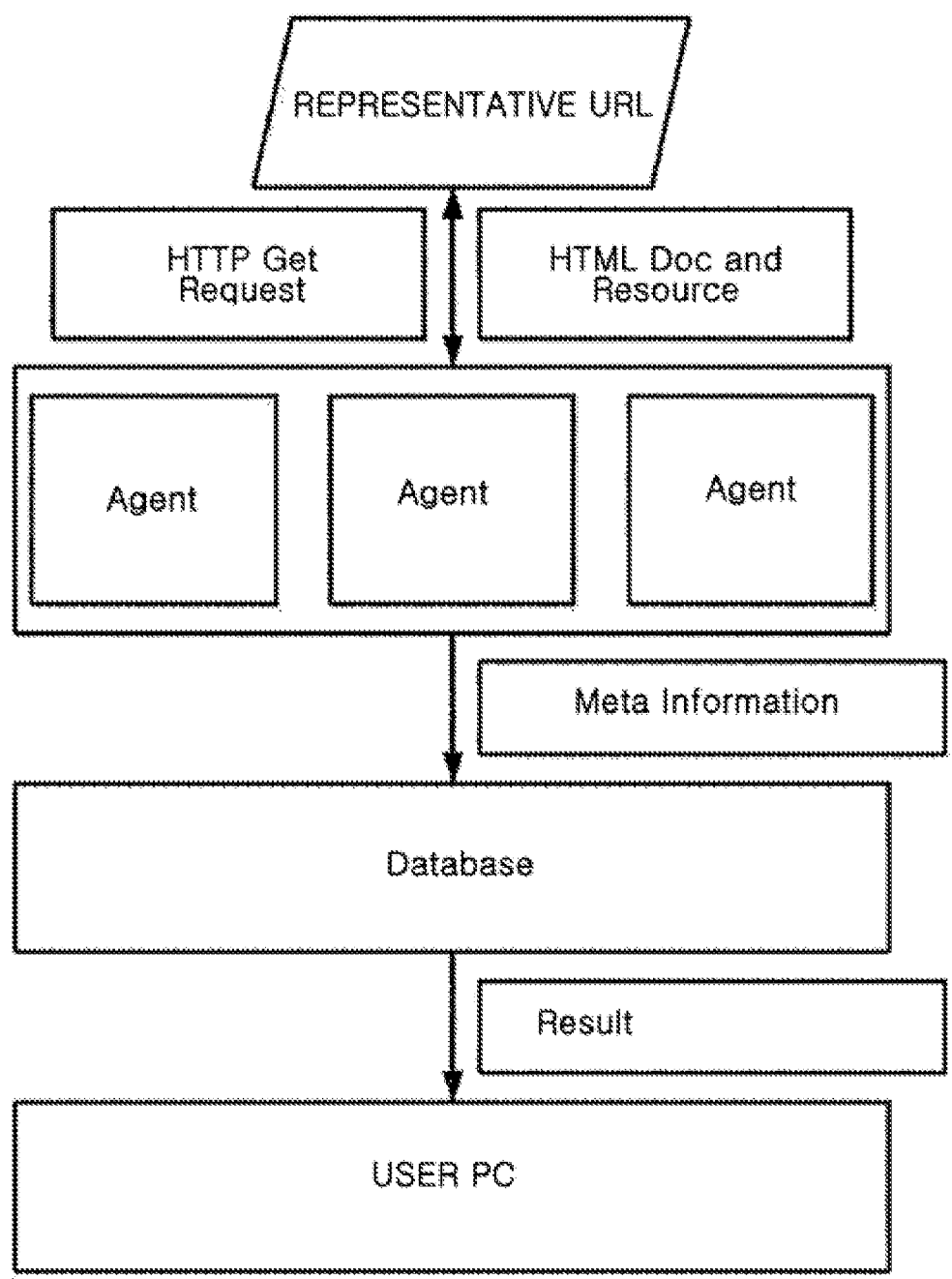
FIG. 15A, FIG. 15B and FIG. 15C illustrate flowcharts of several embodiments of the present invention.
Figure 15B:
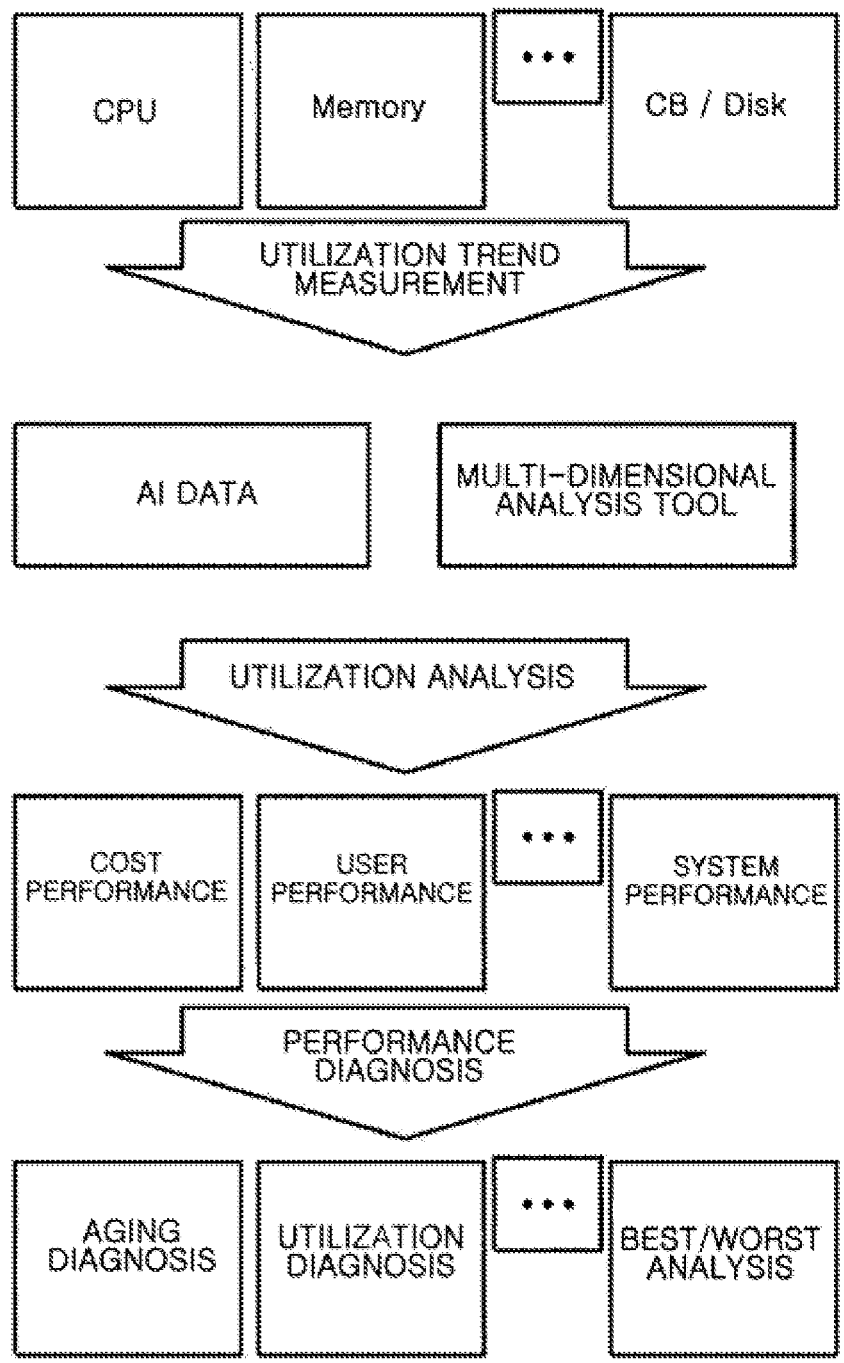
Figure 15C:
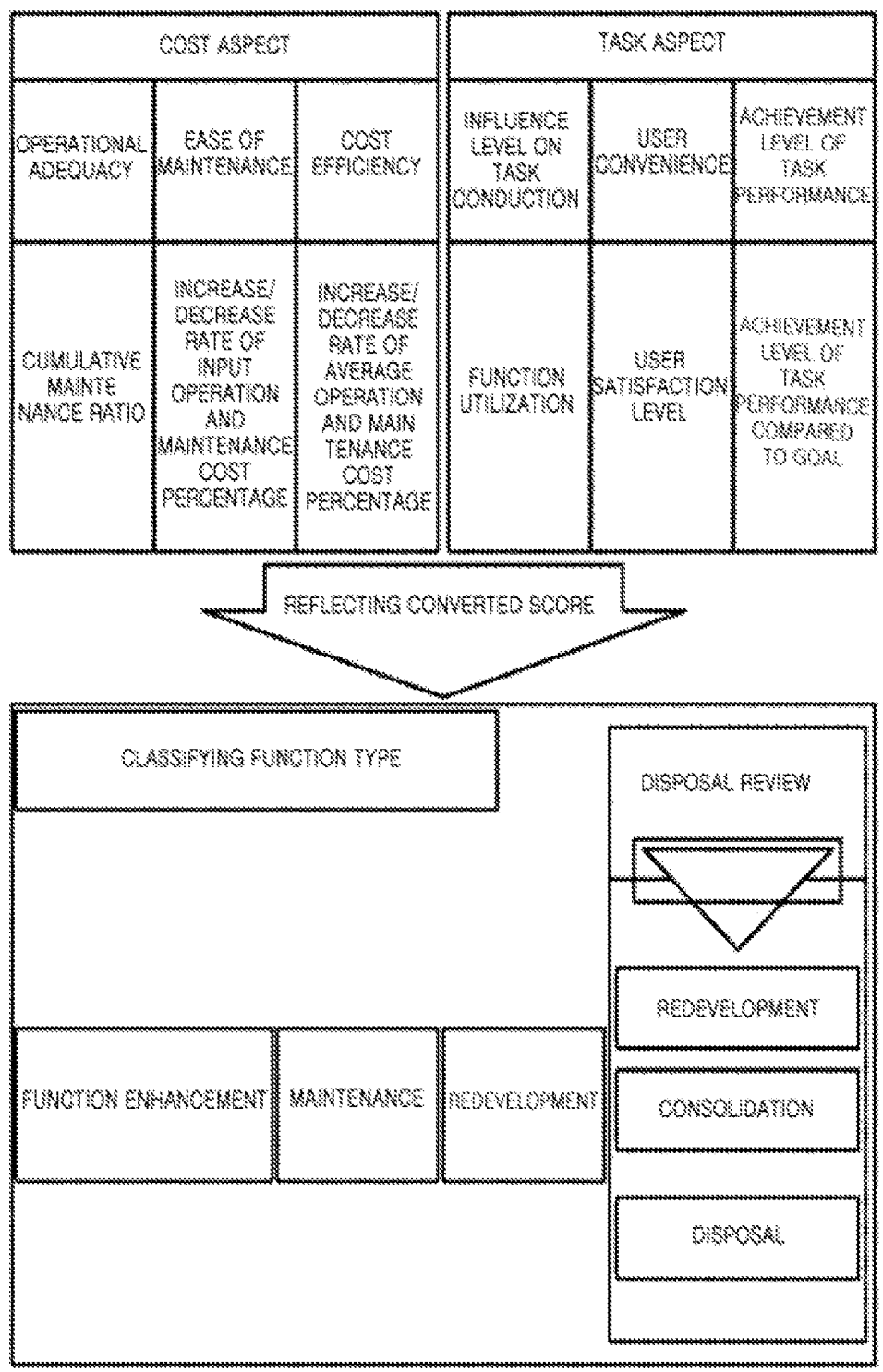

FIG. 15A, FIG. 15B and FIG. 15C illustrate flowcharts of several embodiments of the present invention. When the present method of measuring operation performance of the intelligent information system is used, various functions may be performed, and FIG. 15 illustrates a configuration to which the embodiment may be applied.

FIG. 15A illustrates an automatic collection and mapping of functional URLs through the function information collector 10, FIG. 15B illustrates an analysis of cost per transaction through an AI analysis of an aging level through resource utilization measurement, and FIG. 15C illustrates the algorithm of function utilization measurement and type determination through an automated method.

In FIG. 15A, the automatic collection and mapping of function URLs through the function information collector 10 refers to collecting all connected hyperlinks using the representative URL of the system, extracting the list and URL corresponding to each function, and automatically arranging them.

FIG. 15B shows a content of analyzing the cost per transaction through the aging analysis AI through resource utilization measurement and illustrates a process of automatically analyzing system aging and operating costs through measurement of a usage trend of the system by using the real-time measurement of utilization of the system such as CPU and Memory, and AI data.

FIG. 15C illustrates an algorithm for measuring function utilization and determining the type through the automated method, which has a function to determine maintenance, redevelopment, function enhancement, and disposal review according to the conversion scores of the cost aspect and task aspect of the system, and determine the disposal review to redevelopment, consolidation and disposal as the final maintenance management type again.

Although the present invention has been described in detail through the representative embodiment hereinabove, it will be appreciated by those skilled in the art that various modifications of the embodiment of the present invention can be made without departing from the scope of the present invention. Therefore, the scope of the present invention should not be determined to be limited to the embodiment and should be defined by appended claims to be described below and all changed or modified forms derived from equivalent concepts to the appended claims.

What is claimed is:

1. A method for measuring an operation performance of an intelligent information system, which evaluates, analyzes, and diagnoses an operation performance of the information system providing an IT service, the method comprising: planning with registering basic evaluation information including status information, cost information, input element information, and a performance goal for evaluating the information system, setting an evaluation condition including a measurement criterion of a measurement time or a measurement schedule, and establishing a plan for evaluating the operation performance; evaluating by performing cost evaluation required for operating the information system, utilization evaluation of determining a utilization frequency and a utilization type, quality evaluation of evaluating the quality of the information system by calculating a measurement index related to a failure of the information system and collecting user satisfaction, and task performance evaluation of determining whether the number of users connected or registered into the information system increases and whether a performance goal is achieved; and analyzing and diagnosing with converting a result value into a numerical value by analyzing the evaluating step, classifying the information system into at least one management type according to the conversion criteria, and diagnosing the operation performance.

2. The method of claim 1, wherein the planning includes registering a basic evaluation information by automatically inputting the basic evaluation information through interworking/linking with an internal system or manually inputting the basic evaluation information according to an input criterion of input items provided by the information system by collecting status documents in which input target information is written; and establishing an evaluation plan by inputting the measurement time and the measurement criterion of the information system, and setting a schedule of each step of cost evaluation, utilization evaluation, quality evaluation, task performance evaluation, and management type determination.

3. The method of claim 1, wherein in the evaluating, the cost evaluation further includes receiving cost information including initial development cost, additional development cost, maintenance cost, and operation cost of the information system; and calculating a conversion score according to a preset evaluation criterion by receiving the cost information and determining operational adequacy, ease of maintenance, and cost efficiency of the information system.

4. The method of claim 1, wherein in the evaluating, the utilization evaluation further includes classifying each function used in the operation of the information system and classifying the frequency of utilization of the function into a low frequency, medium frequency, high frequency, or event according to a preset evaluation criterion; and testing the information system during a predetermined period and classifying the number of visits (clicks) and utilization time for the function as non-utilization, under-utilization or utilization according to a preset evaluation criterion.

5. The method of claim 1, wherein in the evaluating, the quality evaluation further includes evaluating the system quality and the service quality of the information system, wherein the system quality is evaluated based on failure data related to the failure and recovery of the information system, and the service quality is evaluated based on preset response data required for operation for information processing; and collecting the evaluation results of the system quality and the service quality and converting the result of the quality evaluation into numerical values.

6. The method of claim 1, wherein the evaluating further includes classifying the information system according to the characteristics of the system including the client/server, web, database, and mobile app; and collecting each function through a function information collector and an agent in the information system.

7. The method of claim 6, wherein the function information collector inputs a representative URL or a sub-URL for collection of the information system, recognizes or extracts a hyperlink and a menu name of a web page to parse the extracted data, and automatically generates a menu ID to store data in a hierarchical structure.

8. The method of claim 6, wherein the agent collects performance information in which each function of the information system is utilized, and monitors whether the performance information is continuously collected.

9. The method of claim 1, wherein the analyzing and diagnosing further includes calculating the result value of the evaluating step separately in terms of the cost aspect and the task aspect; and determining the management type by dividing the management type of the information system into at least one of redevelopment, maintenance, functional enhancement and disposal according to the result value in terms of the cost aspect and the task aspect.

10. A non-transitory computer readable recording medium having a program executing a method for measuring an operation performance of an intelligent information system, which evaluates, analyzes, and diagnoses an operation performance of the information system providing an IT service, the method comprising: planning with registering basic evaluation information including status information, cost information, input element information, and a performance goal for evaluating the information system, setting an evaluation condition including a measurement criterion of a measurement time or a measurement schedule, and establishing a plan for evaluating the operation performance; evaluating by performing cost evaluation required for operating the information system, utilization evaluation of determining a utilization frequency and a utilization type, quality evaluation of evaluating the quality of the information system by calculating a measurement index related to a failure of the information system and collecting user satisfaction, and task performance evaluation of determining whether the number of users connected or registered into the information system increases and whether a performance goal is achieved; and analyzing and diagnosing with converting the result value into a numerical value by analyzing the evaluation step, classifying the information system into at least one management type according to the conversion criteria, and diagnosing an operation performance.

* * * * *